April 12, 1927.
F. L. SIMMONS
1,624,076
MAGNETIC BAR POLE CHUCK
Filed Oct. 6, 1920      3 Sheets-Sheet 1
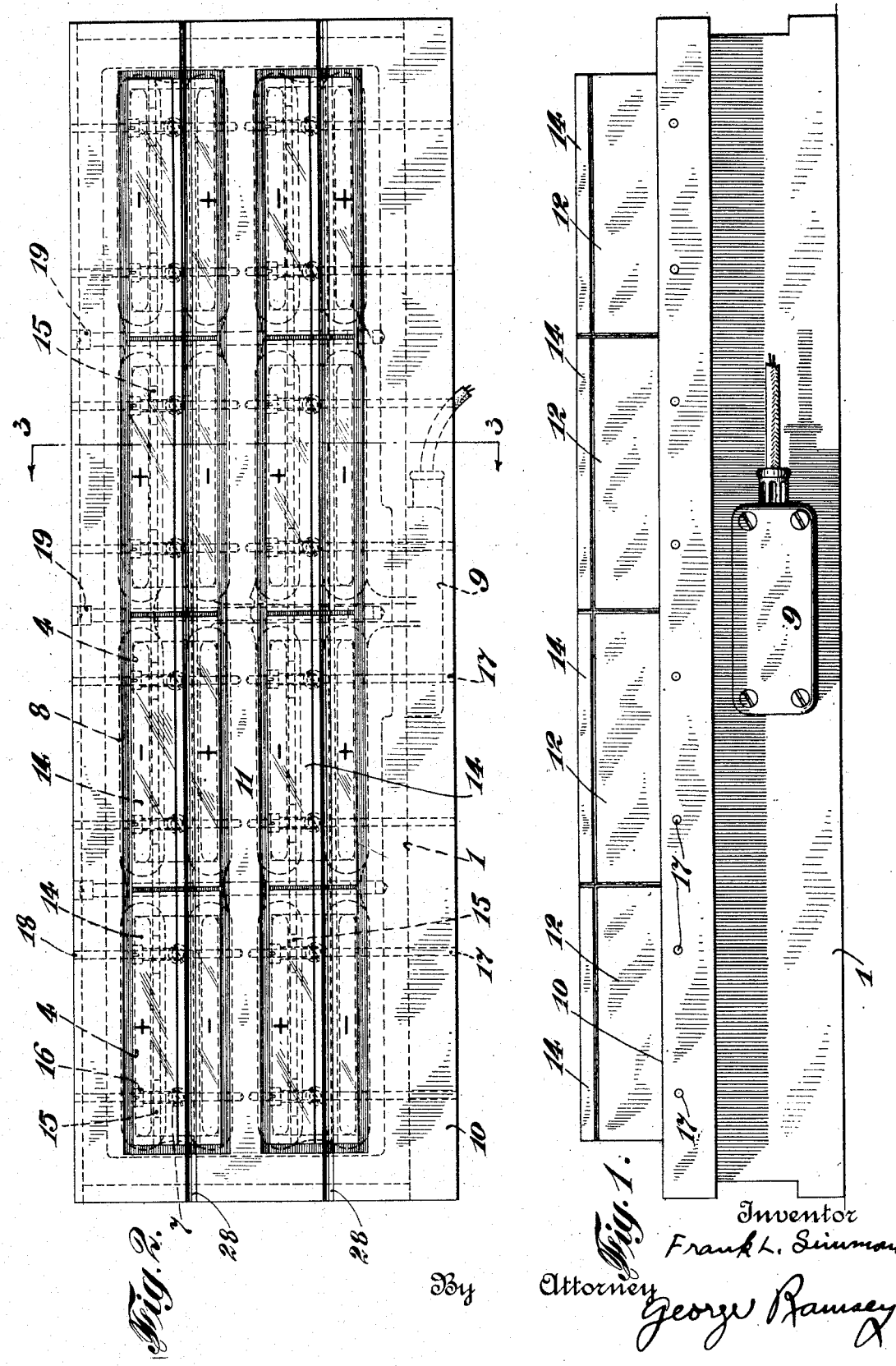
Inventor
Frank L. Simmons
By Attorney
George Ramsey April 12, 1927. 1,624,076
F. L. SIMMONS
MAGNETIC BAR POLE CHUCK
Filed Oct. 6, 1920    3 Sheets-Sheet 3
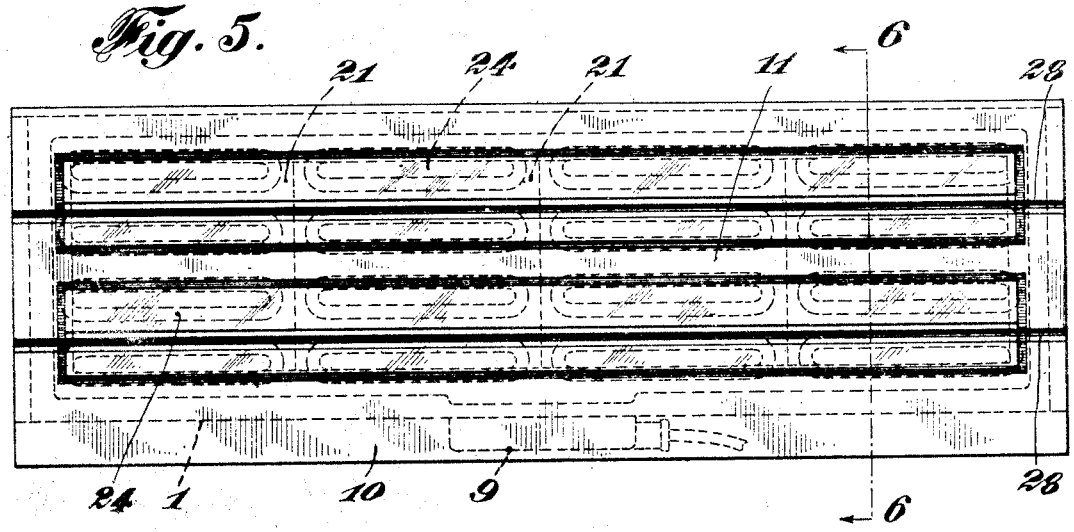
Fig. 5.
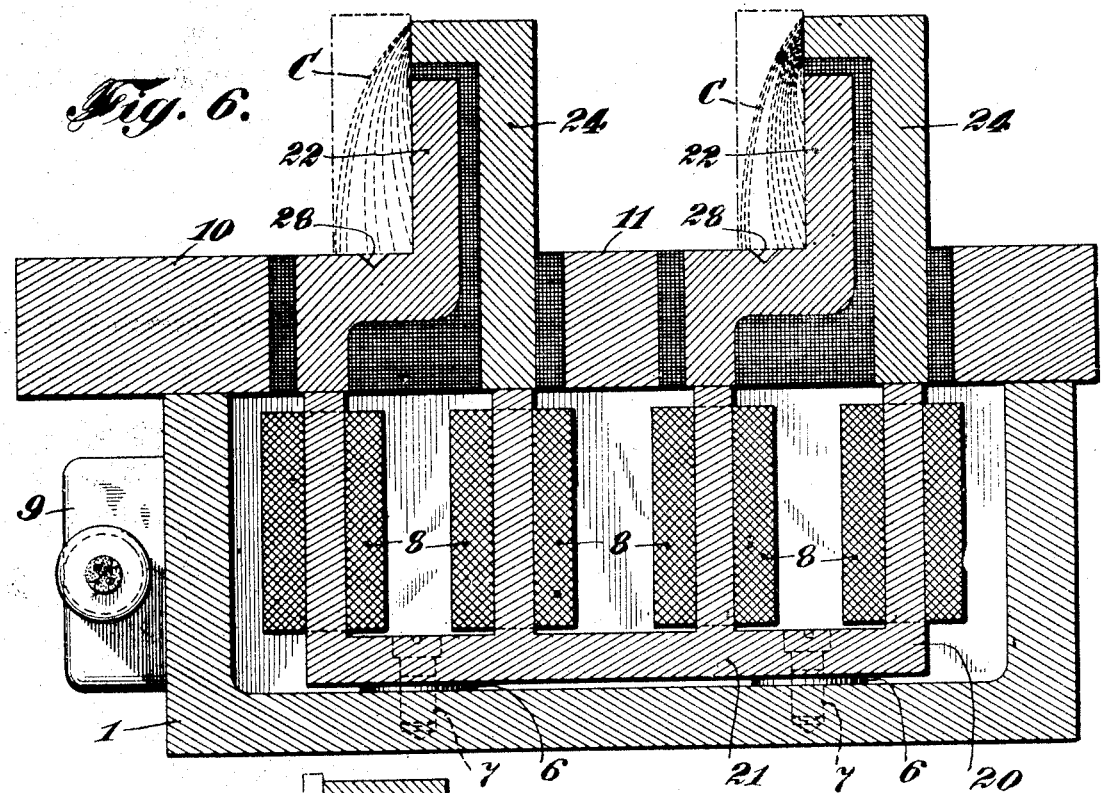
Fig. 6.
Fig. 7.
Frank L. Simmons
Inventor
George Ramsey
By Attorney Patented Apr. 12, 1927.

1,624,076

UNITED STATES PATENT OFFICE.

FRANK LEROY SIMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

MAGNETIC BAR POLE CHUCK.

Application filed October 6, 1920. Serial No. 415,173.

This invention relates broadly to magnetic chucks and more specially to constructions for concentrating and localizing the magnetic forces.

The principal object of the present invention is to provide a magnetic chuck with a plurality of longitudinally extending face plate pole pieces supported upon and energized by a plurality of unit coil core pieces.

Another object of the present invention is a magnetic chuck having a plurality of longitudinally extending face plate pole pieces each of which are supported upon a plurality of unit coil core pole pieces, with all the core pieces under a single face plate pole piece wound to produce the same magnetic signs when energized by a suitable electrical current.

A further and important object of the present invention is a magnetic chuck having a plurality of face plate pole pieces extending above the supporting area of the face plate with the holding faces of the pole pieces disposed to hold work for edge grinding.

Another object of the present invention is a magnetic chuck provided with a face plate adapted to support work against grinding or machine forces and magnetic poles having work faces angularly disposed to the supporting face whereby work is magnetically held against one face and supported against another face.

A still further object of the present invention is a magnetic chuck provided with a plurality of face plate pole pieces having vertical extensions which are provided with vertical holding faces whereby work may be supported edgewise on the magnetic chuck.

A still further object of the present invention is a magnetic chuck having a face plate comprising a frame with a bridge member across said frame and with tie pieces extending from the sides of said frame to the bridge member.

A still further object of the present invention is a magnetic chuck having a frame provided with a bridge member extending longitudinally thereof, with individual coil carrying pole pieces directly beneath each face plate pole piece, with the core pieces supported on the base of a suitable housing, and having tie members extending across the face plate frame and certain of the pole pieces to provide a rigid structure.

A still further object of the present invention is an article of manufacture comprising a face plate for a magnetic chuck having a plurality of pole pieces extending from the supporting surface of the face plate with a face plate frame surrounding the pole pieces, and magnetically separated therefrom, and tie members of non-magnetic material extending through said pole pieces and said frame.

Other and further objects of the present invention will in part be obvious and will in part be pointed out hereinafter in the specification following by reference to the accompanying drawings forming a part thereof and in which like parts are designated by like characters throughout the several figures.

Realizing that the present invention may be embodied in constructions other than those specifically shown and described, I desire that the disclosure herewith shall be considered as illustrative and not in the limiting sense.

Figure 1 is an elevational front view of a chuck embodying the present invention;

Figure 2 is a plan view of one form of face plate of a chuck embodying the present invention;

Figure 5 is a plan view of another embodiment of the same invention;

Figure 6 is a sectional view on line 6—6 of Figure 5;

Figure 7 is a detail view illustrating one method of mounting work on the face plate.

The most common type of magnetic chucks comprises a magnetic chuck having a rectangular body portion with a plurality of transversely extending face plate pole pieces. Where such chucks are utilized for holding work for edge treatment such as milling or grinding it has been customary to pursue one of two methods. One method being to support the work edgewise on the face plate by means of suitable parallels and rely upon magnetic holding forces exerted on the supporting edge of the work to hold the work while it is being operated upon. In view of the fact that the edge of the majority of work which requires edge treatment is thin, the path of the magnetic forces is very limited and the result, therefore, is that the holding power is often insufficient. The second method comprises the utilization of magnetizable auxiliary parallels or the like which set on the work face of the chuck and hold the work in position by means of magnetic forces transmitted through such auxiliary fixtures. This method is more satisfactory than the first but has disadvantage in that the auxiliary pieces are movable over the face plate and for certain accurate work it is desirable that the parts shall be retained rigidly as set.

The present invention overcomes the difficulties of the known art by providing a magnetic chuck having face plate pole pieces arranged to carry the magnetism above the supporting surface of the face plate and to concentrate the magnetism in a zone or plane angularly disposed to the supporting surface, preferably at right angles thereto, although other angles may be utilized as desired. In this construction the parts are very rigidly and solidly arranged with core pole pieces setting on the base of the housing and directly beneath the face plate pole pieces so that the shocks due to grinding or cutting tools is directly supported by metal to metal contact through to the base of the machine bed and the holding forces being angularly disposed to the supporting surface provides a construction wherein work is very rigidly and securely held. Furthermore, the construction of the pole pieces is such that the magnetic forces are concentrated within a relatively small restricted area so that great holding power per unit of surface area is provided. By providing a plurality of core pole pieces having bases, for completing the circuit of the magnetic lines of force, constructed to contact one with another a large area is provided for the magnetic forces so that there is no appreciable leakage of the magnetic forces to the housing and these forces are therefore concentrated over the face plate.

Figure 3:
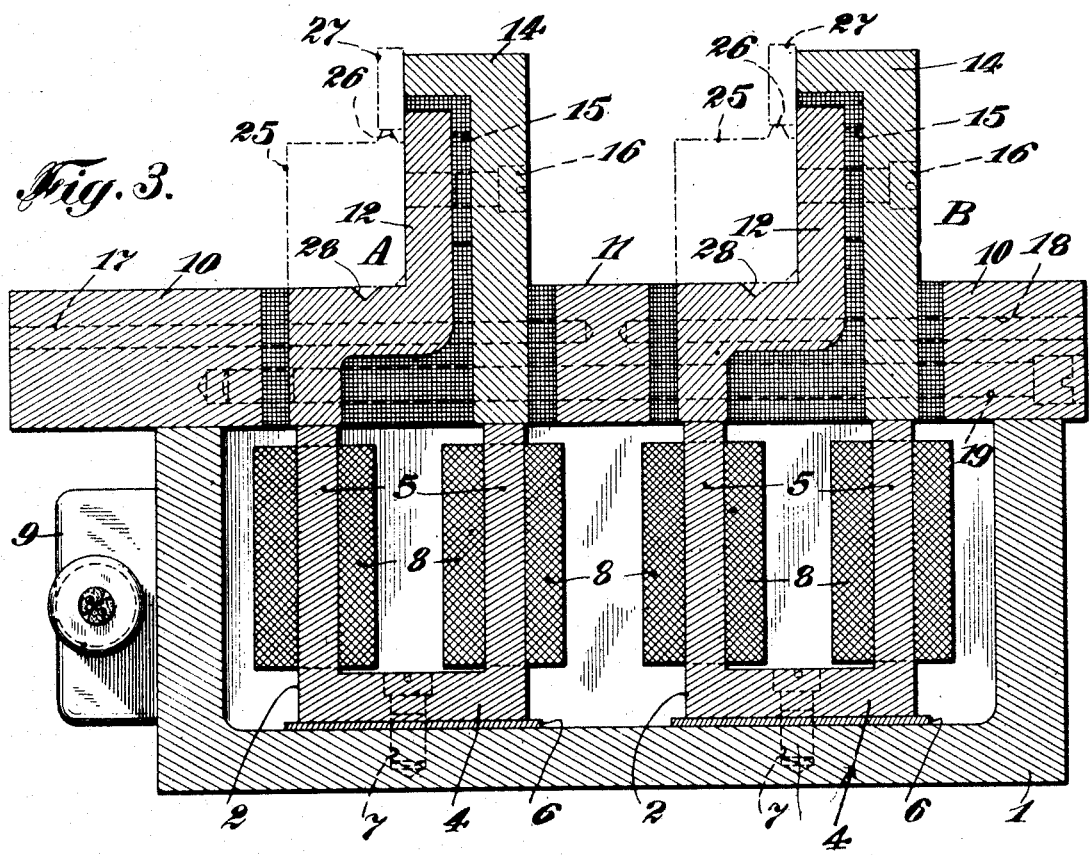
Figure 3 is an end sectional view through the chuck illustrated in Figures 1 and 2.

Referring to the drawings and more especially to Figures 1 to 3, inclusive, which illustrate one form of the invention, the non-magnetized housing 1 preferably comprises an open box adapted to receive and support a plurality of cores 2 having bases 4 and core pole pieces 5. These cores are set upon brass or other non-magnetic metal plates 6, and are held in position by non-magnetic metal machine screws 7. These core pole pieces comprise longitudinally extending rounded end parallel plates which carry individual coils 8. Preferably there are two groups of rows of cores and their respective coils as indicated in Figures 2 and 3. These coils may be connected in various ways but preferably are connected in two groups in such manner that the groups may either be utilized in a series circuit or a parallel circuit, whereby the chuck may be adapted for 110 volts or 220 volts, as the user may desire. The terminals for the coil circuits may enter a suitable terminal box 9 to which the electrical current may be led by suitable connectors. Preferably the upper edges of the housing and the upper ends of the core pole pieces when in position in the housing are all arranged in a common plane.

A suitable face plate having the under surface thereof preferably arranged to lie in a single plane, is adapted to fit over the housing and core pole pieces and be energized thereby as will hereinafter be explained. Preferably the face plate comprises a non-magnetized frame 10 which is substantially rectangular in form and preferably is provided through the longitudinal middle thereof with an integral rib or bridge 11. Z-shaped pole pieces 12 are arranged over one set of core pole pieces and L-shaped pole pieces 14 are arranged adjacent the Z-shaped pole pieces with the L-shaped pole pieces directly over and in contact with the other set of core pole pieces. The upper ends of the L-shaped pole pieces extend over one of the arms of the Z-shaped pole pieces and terminate in the same plane as the side of the Z-shaped arms. This provides work faces on the pole pieces which are substantially at right angles to the supporting face of the face plate. Preferably non-magnetizable washers 15 such as brass or the like are mounted between the pole pieces adjacent the extensions thereof, and non-magnetizable machine screws 16 extend through the pole pieces and the washers and bind the parts securely together. The space between the pole pieces and the frame and also between the pole pieces and the bridge is filled with babbitt metal or the like which is non-magnetizable and which tends to expand on cooling so that the parts will be securely embedded therein and will be substantially waterproof. In order to further secure rigidity in the face plate the pole pieces of the frame preferably are drilled and non-magnetizable material such as brass, or the like, dowel pins 17 are driven through the front frame and the front group A of the pole pieces; while rear dowel pins 18 of the same character are driven through holes bored through the rear frame and the rear group B of the pole pieces. In the construction shown in Figures 1, 2, and 3 a single face plate pole piece is provided for each core pole piece and these face plate pole pieces are arranged in groups separated by transverse lines of non-magnetic material. Transversely extending cross brace screws 19 extend through openings drilled from the back bar of the frame through the bridge 11 through both groups A and B of the pole pieces and are screw threaded into the front bar of the frame. Preferably these cross brace screws extend between the ends of the groups of pole pieces, thereby providing a cross support member at the end of each pole piece group. This provides an exceedingly rigid, firm, construction.

Referring to Figure 2 it will be noted that the core pole pieces when energized by suitable current are arranged to be polarized in alternation so that alternate core pieces are of opposite magnetic signs thereby correspondingly energizing the face plate pole pieces.

Figure 4:
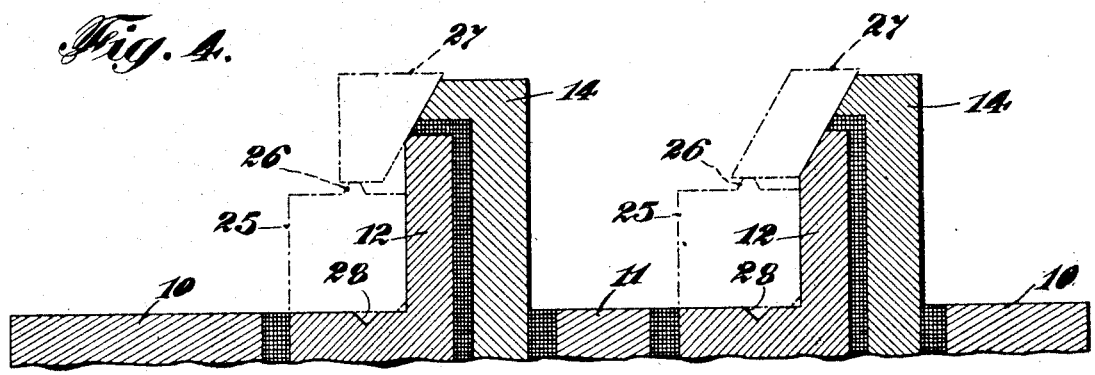
Figure 4 illustrates the invention embodied in the face plate having work faces inclined to vertical.

As shown in Figure 4 the face plate pole pieces may be inclined at degrees other than 90 degrees dependent upon the type of work for which the chuck is adapted.

In Figures 5 and 6 a slightly different embodiment of the present invention is illustrated and wherein the cores 20 are arranged with bases extending the full width of the chuck and the ends of the core pieces are machined and abutted tightly together so that a complete base floor 21 is provided through which all of the magnetic return forces are adapted to be conveyed. In the embodiment illustrated in Figure 5 the face plate pole pieces 22 and the face plate pole pieces 24 extend the full length of the chuck and each pole piece is in contact with a plurality of core pole pieces of the same magnetic sign. The magnetic fields in this type of chuck comprises the base field and the longitudinally extending face plate field with a plurality of individually energized posts, comprising core poles, extending between two fields and forming the magnetic path between the fields. This provides an exceedingly strong holding force over the work face of the chuck. As illustrated in Figure 6, the magnetic lines C from the end of the L-shaped pole piece traverses the work and returns through two faces of the Z-shaped pole pieces with the majority of the lines of force returning through the vertical face portions. This tends to hold the work very tightly against the work face.

Preferably supporting blocks 25 (Figs. 3 and 4) are provided with ribs 26 which form pivots on which the work 27 is adapted to set. Also it is desirable to provide grooves 28 adjacent the work face and suitable rods 29 (Fig. 7) may be provided in these grooves so that the work may pivot on the rods and the rods may turn or roll in the grooves to permit the work to be closely set against the work face of the poles.

From the foregoing it will be noted that the construction herein provided is such as to concentrate magnetic forces in such manner as to securely hold work by sidewise forces while the work is supported directly against vertical forces.

Throughout the present specification and claims the words "vertical" and "horizontal" are utilized more particularly as convenient designations for the relation of the parts, and not particularly with reference to the actual dimensions in reference to the surface of the earth; it being clearly obvious that the present chuck could be used on one side as well as the base.

Having thus described my invention what I claim is:

1. A magnetic chuck comprising a face plate having a horizontal supporting face, vertically extending pole pieces having side holding faces angularly disposed to said supporting face, and non-magnetic material between said pole pieces, one of said poles having a sidewise extension extending across another pole and terminating in the same plane as the other said pole to form said holding face.

2. A magnetic chuck comprising groups of core pieces, Z-shaped face plate pole pieces vertically arranged and adapted to be energized by one group of core pieces, and L-shaped face plate pole pieces also vertically arranged and adapted to be energized by the other group of core pieces.

3. A magnetic chuck comprising groups of core pieces, a series of Z-shaped face plate pole pieces vertically arranged and adapted to be energized by one group of core pieces, and a series of L-shaped face plate pole pieces also vertically arranged and adapted to be energized by the other group of core pieces, said pole pieces being arranged to constitute groups of pole pieces vertically disposed to a horizontal supporting base.

4. A magnetic chuck face plate having a horizontal supporting surface and comprising a pair of longitudinal pole pieces having operative faces located in the same plane, said plane being substantially perpendicular to said horizontal surface and the operative face of one pole piece being higher than the operative face of the other pole piece.

5. A magnetic chuck comprising in combination a face plate having a horizontal supporting surface, a plurality of face plate pole pieces having holding faces extending vertically from said supporting surface, the face of one pole piece being nearer said horizontal surface than the face of another of said pole pieces, and electromagnetic means to polarize said pole pieces.

6. A magnetic chuck comprising in combination a face plate having a horizontal supporting surface, a plurality of face plate pole pieces having holding faces extending vertically from said supporting surface, the face of one pole piece being nearer said horizontal surface than the face of another of said pole pieces, a work rest positioned on said horizontal supporting surface adjacent said pole pieces, and electromagnetic means to polarize said pole pieces.

FRANK LEROY SIMMONS.